United States Patent Office 3,193,543
Patented July 6, 1965

3,193,543
PROCESS FOR THE POLYMERIZATION OF FLUORINATED MONOMERS
Mario Ragazzini, Donato Carcano, Carmine Garbuglio, and Andrea Doria, Milan, Italy, assignors, by mesne assignments, to Edison, Milan, Italy, a corporation of Italy
No Drawing. Filed Mar. 18, 1963, Ser. No. 266,071
15 Claims. (Cl. 260—92.1)

The present invention relates to a process for the polymerization of fluorinated monomers, and more particularly for the polymerization of tetrafluoroethylene.

Various methods for the polymerization of tetrafluoroethylene have been described. The catalytic systems presently employed for the polymerization of tetrafluoroethylene are based either on peroxides or redox systems, or redox system in the presence of an electron transfer agent as an activator. In the case of peroxides, water soluble or insoluble peroxides may be employed.

In the case of water soluble peroxides the polymerization proceeds with fairly good rate only at a temperature higher than 50° C., giving polymers which do not show very satisfactory mechanical characteristics owing to the reactions of "chain transfer" which, as is known, increase in the radicalic polymerization by increasing temperature.

In the case of water insoluble peroxides the resulting polymer shows a low molecular weight and is obtained with very low yields so that the method proves to be unprofitable.

With the normally employed redox systems the temperature range within which the polymerization may be performed drops down to room values; in this way the resulting polymer may show good characteristics, provided that particular care is devoted to the dosage and mixing of the catalysts. The polymer, however, is generally polluted by the presence of the peculiar reducing agents, of the kind of bisulfites, hydrosulfites, oxalates, citrates, etc., which are normally employed in the redox systems. The process becomes furthermore complicated when recourse is made to a third substance electrons transfer agent.

It is an object of the present invention to provide a process for the polymerization of TFE which allows the polymerization to be carried out within a wide temperature range and which results in the formation of high molecular weight polymers showing particular purity and very good mechanical characteristics, with unexpectedly high yields.

Other objects of the invention will be apparent to those skilled in the art from the accompanying description.

The above objects are accomplished, according to the present invention, by a process which comprises polymerizing tetrafluoroethylene under conditions which allow the polymerization to be rapidly carried out and easily controlled in the presence of a catalytic system constituted of an inorganic peroxide and of a water soluble silver salt.

According to the invention polymerization is carried out in aqueous medium containing dissolved a buffering agent, for example borax or pyrophosphate, in such a concentration that the resulting pH falls within the range of about 7 to 11, with liquid or gaseous monomer while operating generally with a ratio water: monomer comprised between 0.5/1 and 20/1. These indications, however, have no restrictive character inasmuch as also when operating below or above said ratios, polymers of very good characteristics are obtained.

The preferred peroxides for carrying out the present invention are ammonium persulphate and persulphates of alkaline metals; they are employed in amounts comprised between 0.5 g. and 0.05 g. per liter of water.

Water soluble silver salts to be employed as activators in the execution of the present invention are silver salts which, owing to their water solubility, can originate $Ag^+$ ions; however the preferred salt is silver nitrate. It is employed in concentration of 0.05 g. to 0.002 g. per liter of water; preferably in a concentration of about 0.01 g. per liter of water.

Components of said catalytic system are preferably employed in molar ratio peroxide:hydrosoluble silver salt comprised between 50 and 1, preferably between 10 and 4.

Temperature and pressure conditions under which the polymerization process of the present invention is carried out will depend on the desired qualities of the polymer. The temperature may be higher or lower than the critical temperature of TFE (33.3° C.) but particularly it is comprised in the range of 0° to 100° C. even though the catalyst is active at higher temperatures.

When polymerization is carried out at a temperature lower than the critical temperature of TFE and at such a pressure as to have the TFE in a liquid state, a high molecular weight polymer, endowed with high grade mechanical properties, is obtained.

The polymerization of TFE in liquid state is carried out under pressure in the range of about 18 to about 300 atm. under the autogenous pressure or under pressure of inert gases.

The polymerization is however preferably carried out, according to the present invention, by using such temperatures and pressures as to have the monomer in a gaseous state; in this way it is possible to work at considerably lower pressures, thus allowing a much easier regulation of the reaction and the use of much simpler equipment, with a great operational safety and more precise temperature control; that is, it is possible to work with a great excess of water which acts as a thermal stabilizer, and the monomer feed may be controlled with the desired precision. A polymer of high physical, physiochemical and mechanical characteristics, finely dispersed in the form of particles of high dimensional uniformity and free of agglomerates will be obtained. It is possible to achieve such conditions by operating either at a temperature higher than the TFE critical temperature, or at a temperature lower than the same critical temperature, however under a pressure lower than the vapour pressure of liquid TFE.

While the temperature range may be varied between about room temperature and 50° C., the pressure range is strictly dependent on the temperatures. For temperatures higher than the TFE critical one (33.3° C.) any pressure may be profitably employed, since at said temperatures TFE is always in a gaseous state; it is however preferably operated in the pressure range between about 4 and 40 atm.

For temperatures lower than the TFE critical one any pressure lower than the liquid TFE vapour pressure may be employed, however in the preferred embodiment pressures are maintained in the range between about 4 and 20 atm.

In order to reduce the induction time and to attain a rapid activation of the catalyst, the test is suitably started under a pressure slightly higher than the pressure prescribed for the polymerization. While operating at 20° C. under a TFE pressure of 10 atm. and with a ratio by weight $H_2O/TFE=5$, polymer particles are obtained which pass substantially completely through an ASTM 18 mesh sieve.

The presence in the aqueous medium of a buffering agent which maintains the pH within the range of about 7–11, allows the use of standard autoclaves (stainless steel, enamelled, glazed, etc.) in as much as the eventual acid products which may form during the polymerization of the TFE are neutralized, furthermore it prevents the resulting polymer from being too strongly acid or contaminated by metal salts originated by the etching action on the autoclave, which would entail laborious cleaning operations. Besides all collateral chain-transfer reactions due to the acid substances (HF) and/or to the fluorine organic acids are avoided and enabling a better control over the polymerization speed since there is no variation of the pH in time. As buffering agents in the process according to the present invention such alkaline salts of weak inorganic acids, especially tetraborates and pyrophosphates are employed, which allow a better control of the reaction, while obtaining a particularly pure polymer with high degree of white and practically no ash content.

The polymerization process of the present invention may be utilized either batchwise or in continuous systems.

The introduction of the catalyst into the polymerization system may be carried out either continuously or batchwise so as to partially control the polymerization temperature through monomer conversion. The introduction is generally carried out by means of two metering pumps, i.e., one for peroxides, the other for the silver salt, allowing the formation of the catalytic system in the presence of the monomer to be polymerized.

While the foregoing technique is preferred, it is to be understood that the invention is not limited to such technique for the reason that high yield of polymers of excellent quantity are obtained when the process is carried out using a preformed catalyst. Monomer conversion may be total or partial, the degree of conversion being strictly dependent on, for example, the autoclave type, the stirring system and the sizes of discharged polymer aggregates.

Also, it will be appreciated that the monomer may be introduced either wholly at the beginning of the process or gradually during the reaction itself. The type of autoclave and the stirring system play a determining role in the choice of the introduction system.

Because percentages of catalyst employed is extremely low, with respect to the reactants and yields of polymer per gram of catalyst attain the order of tens of kilograms per catalyst's gram, the ash content of the polymer is extremely minute.

The silver salt is employed at such a low concentration that it is substantially impossible to ascertain whether the compound passes over into its higher valence state, i.e., $Ag^{++}$, hence participates as part of a redox system, or whether it acts merely as an activator in the decomposition of the peroxide.

The polymerizations of the present invention may be carried out in a buffered aqueous suspension or emulsion, in the presence of additives with emulsifying action which are compatible with the polymerization of the fluorinated monomer. Said additives are introduced in the autoclave in very small amounts, with the result that polymers of high apparent density of powder are obtained, even though it is operated under low pressure.

The following examples 1 to 9 will illustrate more clearly the process according to this invention, it being well understood that variations and modifications in the working thereof may be made without departing from the scope of the herein disclosed and claimed invention.

Example 1

In a stainless steel V4A autoclave of 5 liters, equipped with a propeller stirrer and a cooling jacket, after air removing by suction and nitrogen washing, 1500 g. distilled and deaerated water containing dissolved 2 g. of borax
1500 g. tetrafluoroethylene are introduced in sequence.

Temperature is maintained at about 5° C. and then, by means of two metering pumps:

250 ml. aqueous solution containing 0.45 g. $(NH_4)_2S_2O_8$ and
250 ml. aqueous solution containing 0.027 g. $AgNO_3$ are introduced simultaneously into the autoclave through two different valves.

The following ratios are thus achieved:

$$\frac{(NH_4)_2S_2O_8 \text{ moles}}{AgNO_3 \text{ moles}} = 12.4; \frac{(NH_4)_2S_2O_8 \text{ g.}}{C_2F_4 \text{ g.}} = 3.10^{-4};$$
$$\frac{H_2O \text{ g.}}{C_2F_4 \text{ g.}} = 1.33$$

In this way the catalyst is formed in the presence of the monomer to be polymerized. Stirring in autoclave is started; the temperature is maintained at about 5° C., by allowing cold water to circulate in the autoclave jacket. After 6 hours, 1400 g. of white polymer are discharged which shows an apparent density of about 0.3 g./ml. By operating at the same temperature, but introducing the tetrafluoroethylene gradually over a period of time so as to maintain a pressure of about 6 atm., thus avoiding to have the monomer in liquid state, the polymerization is more easily controlled, the polymer will be sufficiently subdivided, easily dischargeable and washable. The apparent density of the granular polymer is 0.40 g./ml. In addition, the polymer is fluent and, different from that obtained when polymerizing with a liquid, does not show any tendency to clay.

After processing, the polymers show a tensile strength value of 200 kg./cm.$^2$ and the elongation at break is 400%. All physical determinations were carried out in accordance with ASTM norms.

Example 2

In the autoclave of Example 1, following a similar procedure, the same amount of water, monomer, catalyst and buffering agent are introduced, so as to leave unchanged the ratios of Example 1.

Polymerization temperature is maintained between 20° and 30° C. and after 2 hours an amount of polymer analogous to the one of Example 1 is discharged.

Where all of the tetrafluoroethylene is not introduced initially, but rather over a period of time, so as to maintain a constant working pressure at about 10 atm., the discharged polymer is granular having an apparent density of 0.45 g./l., fluent and washable. The polymers show a tensile strength value of 180 kg./cm.$^2$, and the elongation at break is 350% (determinations according to ASTM norms).

Example 3

In the autoclave of Example 1, while following an analogous procedure 2400 g. distilled and deaerated water containing dissolved therein 3 g. of sodium pyrophosphate
1000 g. tetrafluoroethylene are introduced in that order.

Temperature is maintained at about 5° C. and, by means of the two metering pumps, as in Example 1, 300 ml. aqueous solution containing 0.30 g. $(NH_4)_2S_2O_8$ and
300 ml. aqueous solution containing 0.018 g. $AgNO_3$ are introduced.

The following ratios are achieved:

$$\frac{(NH_4)_2S_2O_8 \text{ moles}}{AgNO_3 \text{ moles}} = 12.4; \frac{(NH_4)_2S_2O_8 \text{ g.}}{C_2F_4 \text{ g.}} = 3.10^{-4};$$
$$\frac{H_2O \text{ g.}}{C_2F_4 \text{ g.}} = 3$$

Temperature is maintained at about 5° C. After a reaction time of about 6 hours 950 g. of white polymer are discharged which show an apparent density of about 0.3 g./ml.

By introducing the tetrafluoroethylene gradually so as to maintain the pressure in the autoclave at about 6 atm., the polymerization will proceed normally with a gaseous monomer and the discharged polymer turns out to be granular, sufficiently fluent, having an apparent density of about 0.5 g./l.

The polymerization is very easily controlled, owing to the great quantity of water that acts as a thermic stabilizer.

The processed polymer shows a tensile strength value of 230 kg./cm.$^2$ and the elongation at break is 450% (determinations carried out according to ASTM norms).

*Example 4*

In a two liter autoclave of the type similar to that used in the preceding examples, are introduced in sequence:

900 g. distilled and deaerated water containing dissolved 1.2 g. of borax
300 g. tetrafluoroethylene.

The autoclave is cooled at 10° C. and pressure is brought to 150 atm. by means of very pure nitrogen.

While keeping the temperature at about 10° C., by means of two metering pumps, the following compounds are introduced using the technique of the preceding examples:

150 ml. aqueous solution containing 0.1 g. $Na_2S_2O_8$
150 ml. aqueous solution containing 0.006 g. $AgNO_3$ Stirring in the autoclave is started and the temperature maintained between about 10° and 15° C.; after 4 hours 280 g. of white polymer are discharged which show an apparent density of 0.5–0.6 g./ml.

The polymer exhibits a tensile strength value of 250 kg./cm.$^2$ and the elongation at break is 450% (determinations according to ASTM norms).

*Example 5*

In a two liter autoclave analogous to that of the preceding examples, and following the same procedure as in the previous examples, the following ingredients are introduced:

900 g. of distilled and deaerated water containing dissolved 1 g. of borax, and
tetrafluoroethylene in the quantity necessary to attain a pressure of 6 atm.

The temperature is maintained at about 20° C. and, by means of the metering pumps, the following compounds are introduced:

50 cc. of a solution containing 0.0173 g. of sodium peroxide ($Na_2O_2$)
50 cc. of a solution containing 0.00625 g. of silver nitrate.

Stirring is commenced and after a reaction period of about 4 hours, during which the pressure is maintained at about 6 atm. 250 g. of a white, granular polymer are discharged, having an apparent density of about 0.5 g./cc. and mechanical characteristics (established according to the ASTM norms) of:

tensile strength: 200 kg./cm.$^2$
elongation at break: 400%

*Example 6*

In the autoclave of Example 1, following the same procedure as in Example 5, are introduced in sequence:

2400 g. distilled and deaerated water containing dissolved 3 g. of borax
300 g. of tetrafluoroethylene.

Temperature is maintained at about 10° C. and by means of the pumps of the preceding examples, the following compounds are introduced:

300 ml. aqueous solution containing 0.1 g. $(NH_4)_2S_2O_8$
300 ml. aqueous solution containing 0.006 g. $AgNO_3$.

The following ratios are achieved:

$$\frac{(NH_4)_2S_2O_8 \text{ moles}}{AgNO_3 \text{ moles}} = 13.4; \quad \frac{(NH_4)_2S_2O_8 g.}{C_2F_4 g.} = 3 \cdot 10^{-4};$$

$$\frac{H_2O g.}{C_2F_4 g.} = 10$$

Temperature is maintained at 10° C., pressure at 6 atm. After 4 hours of very easy controlled polymerization 280 g. of a granular white polymer are discharged having an apparent density of about 0.5 g./ml.

The results of mechanical tests (ASTM norms) are:

tensile strength 250 kg./cm.$^2$
elongation break 450–500%.

While operating under the same modalities however without any buffering agent a very acidic reaction mass is obtained, wherefrom through washing and drying 200 g. of dirty-grey polymer are obtained, which is very acidic and hardly washable.

*Example 7*

In a two liter autoclave of a type analogous to the one of the preceding examples, are introduced in sequence:

900 g. distilled and deaerated water containing dissolved 1.2 g. of borax
500 g. tetrafluoroethylene.

The autoclave is then brought gradually to 50° C. while the inner pressure attains 60 atm.; then, by means of the usual metering pumps, 150 ml. aqueous solution containing 0.1 g. $(NH_4)_2S_2O_8$
150 ml. aqueous solution containing 0.006 g. $AgNO_3$ are introduced.

The following ratios occur:

$$\frac{(NH_4)_2S_2O_8 \text{ moles}}{AgNO_3 \text{ moles}} = 12.4; \quad \frac{(NH_4)_2S_2O_8 g.}{C_2F_5 g.} = 2 \cdot 10^{-4};$$

$$\frac{H_2O g.}{C_2F_4 g.} = 2.4$$

Stirring in the autoclave is started, while maintaining the temperature of about 50° C.; after about 3 hours 450 g. of a granular white polymer are discharged having an apparent density of 0.5 g./ml.

Tensile strength and elongation at break (determined according to ASTM norms) are 160 kg./cm.$^2$ and 300%, respectively.

*Example 8*

A 40 liters autoclave is employed with a stirring rate varying between about 300 and 1000 r.p.m., equipped with an automatic discharge valve placed on the bottom and fitted for operating in continuous or discontinuous way. 20 liters distilled water containing dissolved 10 g. of sodium pyrophosphate are therein introduced under nitrogen stream, subsequently vacuum is made in the autoclave.

TFE is then introduced while regulating the introduction by means of a valve until the pressure in the autoclave has attained 9 atm. Afterwards, through two metering pumps 100 ml. of 1.6% aqueous solution of ammonium persulphate and 100 ml. of 0.2% aqueous solution of silver nitrate are introduced into the autoclave separately but simultaneously.

Stirring in the autoclave is commenced and the reaction course is observed through a pressure recorder. The pressure is allowed to drop down to 8 atm. then is brought again to 9 atm. and so until 4.5 kg. of TFE are compressively charged. The temperature is maintained at about 30° C.

At the end of the run the pressure in the autoclave is equal to vapor pressure at that temperature. The actual time of the polymerization is about 90 minutes. The autoclave is brought to a very slight nitrogen overpressure and the reaction water is drawn off, always under nitrogen stream, by means of a plunged tube equipped with a net filter.

The polymer is washed directly in the autoclave in absence of air, in order to remove the last traces of silver nitrate, which, if left conglobated in the polymer granules, would decrease its degree of whiteness; therefore, 20 liters distilled water are introduced under nitrogen stream, while stirring for some time and then sucking again to insure complete removal of silver nitrate. Water is then introduced while stirring and the polymer discharged through the bottom valve into a container whose bottom is fitted with an inox steel 100 mesh screen.

The thusly obtained polymer is ready for drying and for further processing, if desired. 4.3 kg. of a granular white polymer of practically no ash contents are obtained. Tensile strength and elongation at break (according to ASTM norms) are respectively 200 kg./cm.$^2$ and 350%.

While operating the test under the same condition, employing as the buffering agent 10 g. sodium tartrate, a polymer is obtained shwing 0.03% ash content, of brown coloration which becomes enhanced in the subsequent sintering operations.

*Example 9*

Employing the same equipment as in the preceding example, 20 liters distilled water containing dissolved 10 g. of borax are introduced in the autoclave, kept under nitrogen stream, then evacuated.

TFE is introduced into the autoclave until a pressure of 5 atm. was attained. By means of two metering pumps, 500 ml. of 1.6 aqueous solution of ammonium persulphate and 500 ml. of 0.2% solution of silver nitrate are introduced into the autoclave separately but simultaneously. Stirring is commenced and the reaction course observed through a pressure recorder. The pressure is allowed to decrease to 3.5 atm. and is maintained at this value until total monomer exhaustion at which time 4 kg. of TFE are charged.

At the end of the run, the pressure in the autoclave will be equal to vapor pressure at that temperature. The temperature, controlled and regulated by cold water circulation in the autoclave jacket, varies during the polymerization course within a range of 22°±3° C. The actual time of polymerization is 2 hours.

The autoclave is brought to very light nitrogen overpressure and the reaction water removed by suction through a plunger provided with net filter, always under nitrogen stream. The polymer is washed directly in the autoclave in absence of air, in order to remove the silver nitrate which, if left in the polymer granules, would decrease the degree of whiteness of the polymer. Thereafter 20 liters distilled water are introduced under nitrogen stream, with stirring, for a period of time followed by removal. Water is again introduced and the polymer discharged with stirring into a container having a bottom fitted with a stainless steel 100 mesh screen. The thusly obtained polymer is ready for drying and if desired, further processing. 3.8 kg. of white granular polymer are obtained.

Utilizing the process of this invention as illustrated in the foregoing examples, but in the absence of silver nitrate, only very small traces of polymer are obtained. The pressure in the autoclave remains substantially constant for the duration of the test, thereby confirming the fact that no polymerization takes place. Further, utilizing the technique illustrated in the preceding examples and carrying out the process in the presence of silver nitrate only, the conversion into a polymer is substantially nil, which fact confirms the effectiveness of the ammonium-persulphate/silver nitrate combination.

In addition, operating in the presence of silver nitrate and persulphate, but without a buffering agent, the process does not proceed as smoothly as where a buffering agent is utilized, for the reason that the pH of the aqueous medium varies in the course of the process between about 7 and 3, with the result that the discharged polymer is highly acid, more difficult to purify, and less thermally stable.

We claim:
1. A process for the polymerization of tetrafluoroethylene which comprises homopolymerizing tetrafluoroethylene monomer in an aqueous buffering medium which maintains the pH within the range of about 7 to 11 in the presence of a catalyst comprising silver nitrate and an inorganic peroxide selected from the group consisting of ammonium persulfate, alkali metal persulfate and alkali metal peroxides.

2. The process of claim 1 wherein the catalyst comprises silver nitrate and ammonium persulfate said silver nitrate and ammonium persulfate having a molecular ratio in the range of about 50 to 1.

3. The process of claim 1 wherein the catalyst comprises silver nitrate and an alkali metal persulfate said silver nitrate and alkali metal persulfate catalyst having a molecule ratio of about 50 to 1.

4. The process of claim 2 wherein the molecular ratio between ammonium persulfate and silver nitrate is comprised in the range of about 10 to 4.

5. The process of claim 3 wherein the molecular ratio between alkali metal persulfate and silver nitrate is about 10 to 4.

6. The process of claim 1 wherein tetrafluoroethylene monomer and said aqueous solution of a buffering medium are present in a ratio of about 0.5 to 20 parts by weight.

7. The process of claim 1 wherein silver nitrate is employed in an amount comprised between 0.05 and 0.002 g. per liter of water.

8. The process of claim 1 wherein the aqueous buffering medium comprises a buffering agent selected from borax and pyrophosphate dissolved therein.

9. The process of claim 1 which comprises the carrying out of the polymerization at a temperature comprised in the range of 0° C. to 100° C. and at a pressure of about 4 to about 300 atm.

10. The process of claim 1, which comprises the carrying out of the polymerization at a temperature comprised in the range of 0° C. to 100° C., and at a pressure of about 4 to about 300 atm., under pressure of an inert gas.

11. The process of claim 1, which comprises the carrying of the polymerization under such a temperature and pressure as to have the tetrafluoroethylene monomer in a gaseous state.

12. The process of claim 11, which comprises the carrying out of the polymerization at a temperature higher than the TFE critical temperature (33.3° C.) under a pressure in the range of 4 to 60 atm.

13. The process of claim 12, which comprises the carrying out of the polymerization at a temperature comprised between 33.3° C. and 50° C. under a pressure in the range of 4 to 60 atm.

14. The process of claim 11, which comprises the carrying out of the polymerization at a temperature lower than the TFE critical temperature, under a pressure lower than the vapor pressure of liquid tetrafluoroethylene.

15. The process of claim 14, which comprises the carrying out of the polymerization at a temperature in the range between room temperature and the critical temperature under a pressure comprised in the range of 4 to 20.

References Cited by the Examiner
UNITED STATES PATENTS
3,032,543   5/62   Bro _____ 260—92.1

JOSEPH L. SCHOFER, *Primary Examiner.*

JOSEPH R. LIBERMAN, *Examiner.*